United States Patent [19]

Vecchione

[11] Patent Number: 5,504,845
[45] Date of Patent: Apr. 2, 1996

[54] METHOD FOR REMODELING AND RENDERING THREE-DIMENSIONAL SURFACES

[75] Inventor: Maurizio Vecchione, Encino, Calif.

[73] Assignee: Modacad, Inc., Los Angeles, Calif.

[21] Appl. No.: 411,549

[22] Filed: Mar. 28, 1995

Related U.S. Application Data

[63] Continuation of Ser. No. 139,197, Oct. 20, 1993, abandoned, which is a continuation of Ser. No. 579,386, Sep. 10, 1990, abandoned.

[51] Int. Cl.$^6$ .................................................. G06F 15/62
[52] U.S. Cl. ........................ 395/119; 395/120; 395/125
[58] Field of Search .................. 395/118–126, 129–130, 395/141–143

[56] References Cited

U.S. PATENT DOCUMENTS

| | | | |
|---|---|---|---|
| 4,888,713 | 12/1989 | Falk | 395/125 |
| 4,896,210 | 1/1990 | Brokenshire et al. | 358/88 |
| 4,949,286 | 8/1990 | Ohba | 395/125 |

*Primary Examiner*—Mark R. Powell
*Assistant Examiner*—Huynh Ba
*Attorney, Agent, or Firm*—Blakely, Sokoloff, Taylor, Zafman

[57] ABSTRACT

A three dimensional image of a solid form is presented to an operator by means of a stereoscopic display. The operator defines a panel on the surface of the form with a set of bounding seam lines. A polygonal mesh is generated between the seam lines and is manipulated in three dimensions by the operator to achieve a desired surface appearance, including wrinkles, folds, pleats and other details. Manipulation of the mesh is constrained by the mechanical properties of the surface material or fabric being modelled. Surface texture and shading are then mapped onto the mesh to fully render the surface appearance in three dimensions.

9 Claims, 2 Drawing Sheets

METHOD FOR REMODELING AND RENDERING THREE-DIMENSIONAL SURFACES

This is a continuation of application Ser. No. 08/139,197, filed Oct. 20, 1993, now abandoned, which is a continuation of application Ser. No. 07/579,386, filed Sep. 10, 1990, now abandoned.

BACKGROUND OF THE INVENTION

1. Field of the Invention

This invention pertains to the related fields of computer aided design (CAD) and computer graphics. More specifically, this invention relates to a method for creating a computer rendered image of a three-dimensional object.

2. Background Description

One of the objectives of computer aided design systems is the realistic rendering of an image of a three-dimensional object. By imparting greater realism to computer generated images, a designer is better able to visualize the three-dimensional structure and appearance of an object without actually constructing a physical prototype. Prior art computer graphics systems provide the ability to model a three-dimensional object and rotate it so that a two-dimensional image of the object may be viewed from any direction.

A field in which visualization of objects with applied surface texture is particularly important is fashion design. A number of systems have been developed that allow a fashion designer to apply different fabric textures and patterns onto a computer generated image of a garment. Such systems permit the designer to visualize a garment made from the selected fabric in a realistic manner, including the distortions naturally introduced by the drapes and folds of fabric as it would appear on an actual three-dimensional garment. A system of this type is described in U.S. Pat. No. 4,888,713 issued to Falk. In this particular system, an operator applies an orthogonal mesh to an image of a garment and, using a variety of CAD tools, distorts the mesh so that the mesh appears to have the proper perspective, including wrinkles and folds of the fabric. Texture is then applied using conventional mapping techniques such as described in the above-referenced articles.

An improved texture mapping system with particular application to the fashion design industry is described in this inventor's copending application Ser. No. 07/579,884, filed Sep. 7, 1990 now U.S. Pat. No. 5,333,295 and entitled "Method and Apparatus for Mapping Surface Texture", the disclosure of which is incorporated herein by reference. This system allows an operator to model a surface of an object such as a garment in three dimensions, but depends on the operator's skill in visualizing the perspective appearance of the desired three-dimensional structure.

The present invention provides the operator with a stereoscopic display so that a full three-dimensional view of the object to be modelled is presented. The object may thus be "sculpted" in three dimensions.

SUMMARY OF THE INVENTION

A series of solid forms are constructed using conventional three-dimensional CAD computer modelling. These forms have physical dimensions associated with them as well as other parametric properties. The various forms are placed in a computer database, allowing an operator to select one or more of the forms based on key properties and parameters. The operator can also edit dimensions and other parameters of a given form to obtain a desired modification. Once selected by the operator, the form is displayed using a conventional 3D CAD perspective wire frame mesh.

The operator "draws" in 3D space a series of polygonal bounding lines or "seam lines" around a displayed form. Drawing of seam lines is accomplished using conventional CAD drawing tools, by identifying critical vertices of each polyline. The operator is provided means to manipulate the drawing tools in X, Y and Z space. To accomplish this effectively, the operator is provided with a stereoscopic display.

Each closed set of seam lines define the boundaries of a surface region or panel on the displayed form. A polygonal mesh or grid is overlaid on each panel defined by its respective seam lines. The grid approximates the cloth surface contained in the panel itself. The pitch of the grid is controlled by the operator. The grid is initially laid flat across the panel, but shows the panel's orientation by displaying the flat grid in perspective based on the Z coordinates of the bounding seam lines.

The operator can modify the surface of each panel by using a set of CAD tools. These tools provide the ability to move the seam lines, fold the surface, pin (or fix) the fabric and wrinkle the fabric by moving one or more vertices of the polygonal mesh elements describing the panel's surface.

The system "relaxes" the cloth surface using a cloth simulation model to drape the fabric around the form. The draped cloth is then visualized on the form as a perspective wire frame mesh. The draped form is fully three-dimensional and can be viewed from any angle. Texture and pattern is then applied to the cloth surface using conventional texture mapping techniques. In addition, shading of the draped form can be added and varied with conventional computer graphics techniques.

DETAILED DESCRIPTION OF THE INVENTION

In the following description, for purposes of explanation and not limitation, specific numbers, algorithms, computer implementations, etc. are set forth in order to provide a thorough understanding of the present invention. However, it will be apparent to one skilled in the art that the present invention may be practiced in other embodiments that depart from these specific details. In other instances, detailed descriptions of well-known graphics processing equipment and techniques are omitted so as not to obscure the description of the present invention with unnecessary detail.

Figure 1:
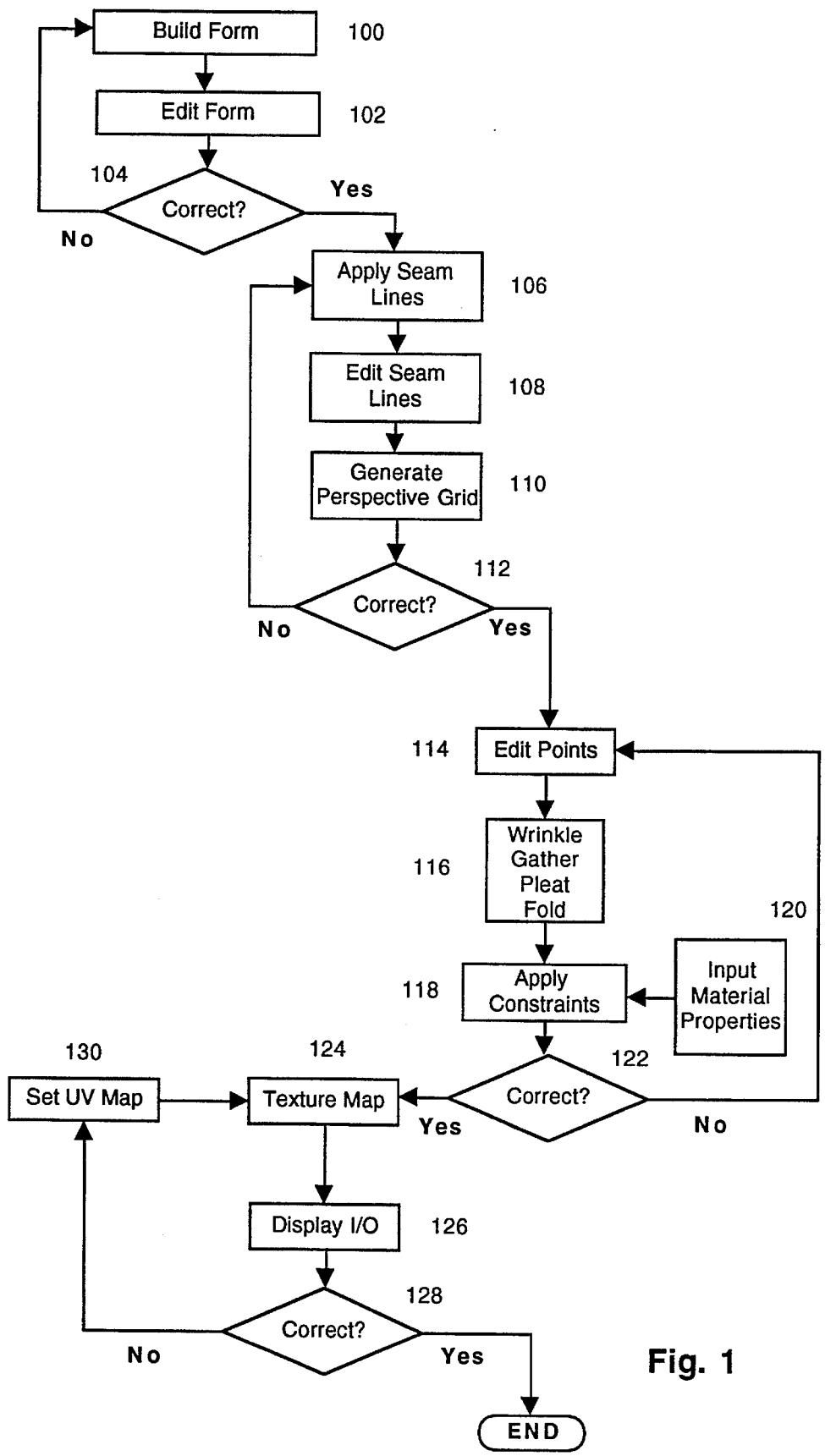
FIG. 1 is a functional flow diagram of the method steps of the present invention.

FIG. 1 presents a functional flow diagram of the method steps for generating a fully draped and textured three-dimensional form. One or more forms are first constructed at step 100 using conventional CAD tools. In the fashion design industry such forms will generally comprise various mannequins; however, it is to be understood that the methods of the present invention are not limited to this particular application and a form may be any three-dimensional object. As a form is constructed, it may be edited at step 102 with conventional CAD tools until the desired appearance is achieved. It is generally desirable that a library of standard forms be maintained in a computer storage device such as a disk or tape drive. Any such standard forms may, of course, be further edited to generate a form for a particular application.

One of the unique aspects of the present invention is the use of a fully three-dimensional stereoscopic display. Conventional three-dimensional CAD systems provide only a two-dimensional display to the operator. While a three-dimensional object modelled by such systems can be rotated and viewed from various directions to examine surface topology, no depth information is conveyed in the image presented to the operator.

As is well-known, a stereoscopic image can be created by simultaneously generating two slightly different images in different colors or with different polarizations and then viewing the images through glasses that selectively transmit only one of the images to each eye. If such dichromatic images are properly constructed, the human brain intuitively combines them providing an illusion of depth. Such techniques are particularly well known in the motion picture industry, but are not known to have been applied in the field of computer aided design.

The stereoscopic display of the preferred embodiment of the present invention is achieved with a conventional color monitor on which a blue line image and a red line image of the three-dimensional form are simultaneously displayed. The blue and red images are rotated with respect to one another by an amount corresponding to the separation of the operator's eyes. By wearing glasses with one red lens and one blue lens, the operator perceives the image of the form as a fully three-dimensional wire frame. Alternatively, by using suitable (but more costly) display equipment, cross-polarized left-eye and right-eye images can be generated and viewed through corresponding cross-polarized lenses Using the same stereoscopic process, the operator is provided with a fully three dimensional cursor so that any point on the form can be unambiguously designated and manipulated by otherwise conventional CAD techniques.

Proceeding to step 106 of FIG. 1, the operator defines a region or panel on the surface of the form by defining a set of bounding polylines or seam lines. These lines are placed on the surface of the form using the 3D cursor. The final line of the set which encloses the desired panel is automatically generated by the operator's selection of a corresponding command from a menu provided by the system. The seam lines may be edited at step 108 by relocating one or more of the vertices.

When the operator is satisfied that the panel is properly defined by the seam lines, a polygonal mesh or grid is generated within the area bounded by the seam lines at step 110. This grid is initially flat, but generally conforms to the three-dimensional definition of the panel and therefore appears with the appropriate depth and perspective. The spacing or pitch of the grid lines is selectively controlled by the operator.

At steps 114 and 116, the operator is provided with a set of tools for manipulating the grid so that it presents the appearance of a fabric surface. The operator can move individual grid points; however, this can be a relatively time consuming process if it is desired to simulate a complex surface with numerous wrinkles and folds. To facilitate manipulation of the grid, the operator is provided with one or more shaped three-dimensional objects or "magnets" that push, pull or stretch the grid within an area of influence. For example, a sharply pointed object can be used to push the grid at selected locations. This will not only relocate the grid point nearest the point of contact of the object, but will also relocate adjacent grid points as if a piece of fabric were being poked with the simulated object. In this manner, the grid may be folded, wrinkled, gathered, pleated and otherwise sculpted as if it were an actual piece of fabric.

The behavior of the grid as it is manipulated by the operator is constrained by the assumption that the underlying form is impenetrable. Furthermore, distortion of the grid is constrained according to the physical properties of a particular fabric being modelled. These physical constraints are imposed at step 118 according to the properties supplied at step 120. The physical properties modelled include factors such as stretchability, flexibility, weight and thickness. These properties may be input directly by the operator, but preferably a library of physical properties is maintained for various fabric types such that the operator need only specify the desired fabric. Although the described embodiment relates particularly to the modelling of fabrics, it will be recognized that the present invention has application to other elastic materials as well. For example, die stamping of sheet metal parts could be simulated with the same techniques.

The behavior of individual points on the grid according to the imposed constraints is computed using an interpolation process. Such an interpolation process suitable for use with the present invention is described in this inventor's copending application referred to above, although other interpolation methods may also be used.

Once the operator has manipulated the grid to achieve the desired appearance of fabric, surface texture is mapped onto the grid at step 124 in accordance with well known computer graphics techniques such as are described in this inventor's copending application. The textured surface of the garment or other object being modelled is displayed to the operator in a full three-dimensional stereoscopic view at step 126. At this point, the operator may examine the detailed appearance of the texture pattern on the individual panels of the garment at step 128. The texture pattern as applied to each panel may be further adjusted at step 130 by a process referred to as "setting" the U,V or texture map.

Figure 2:
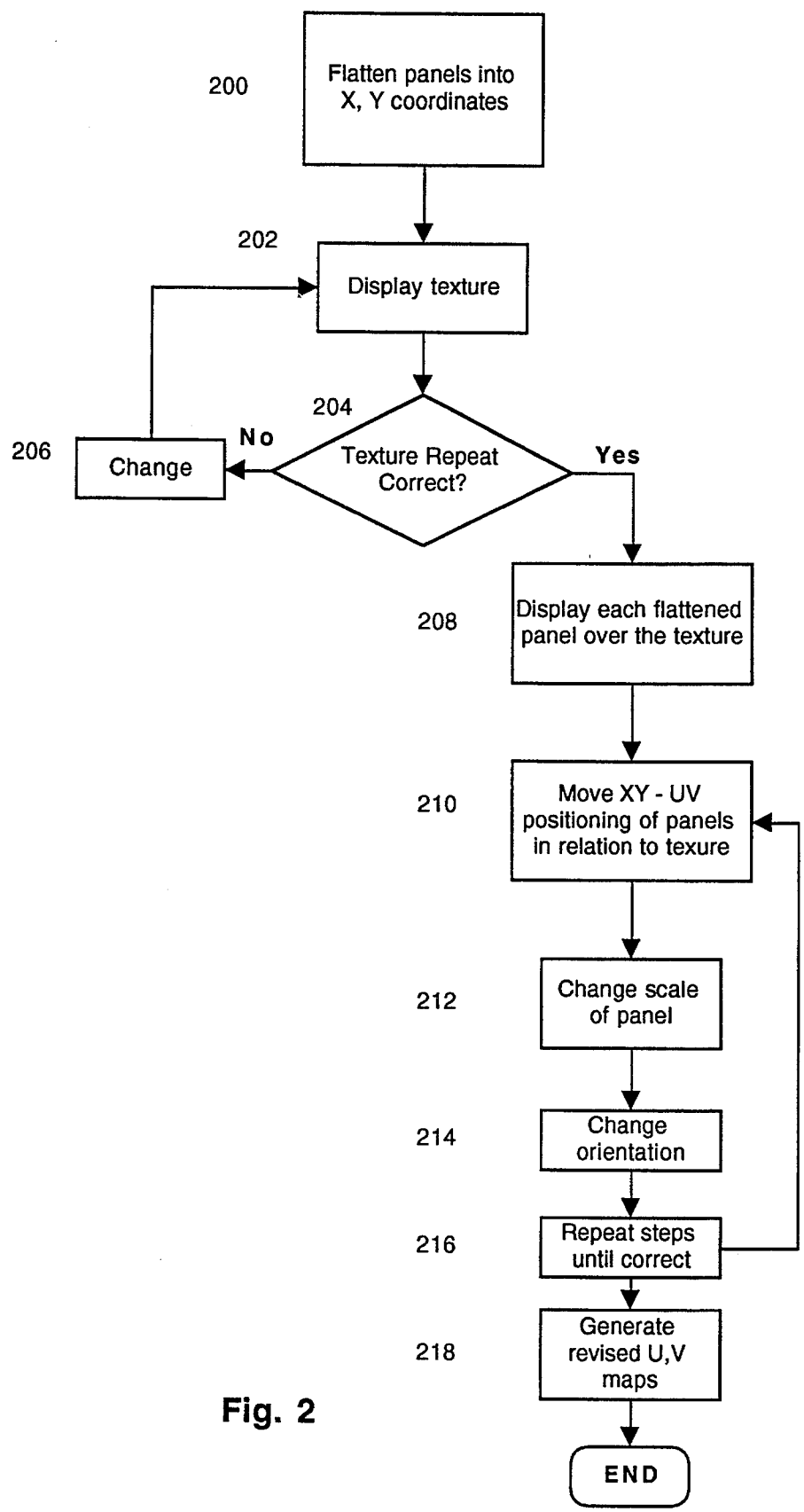
FIG. 2 is a functional flow diagram of the coordinate setting feature of the present invention.

Referring now to FIG. 2, step 130 of FIG. 1 will be described in greater detail. This step allows the panels that have been modelled to be "flattened" and viewed with texture applied as they would actually be cut from the fabric. At step 200, the three-dimensional X,Y,Z coordinates of the panels are transformed to "flat" X,Y coordinates taking into account the same material properties applied at step 118 to "drape" the fabric onto the form.

Steps 204, 204 and 206 permit the operator to alter a repeating texture pattern to achieve a more pleasing appearance on the fabric. For example, it might be desired to change a design that repeats in a checkerboard pattern to one that repeats in a window pane pattern. The flattened panels are next displayed over the texture pattern at step 208. Initially, the panels are displayed randomly scattered over the texture. The operator may now adjust the position, orientation and scale of each flattened panel relative to the pattern of the texture at steps 210–216 until the desired appearance of the panel is achieved. When the operator has completed this process, the mapping functions are reset at step 218 and the end result may be stereoscopically viewed in three dimensions as described above.

The final definition of each panel in "flat" X,Y coordinates may be stored and communicated to automated fabric cutting equipment to produce the actual fabric panels required to construct the modelled garment.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. In a computer graphics system, a method for creating a model of a three-dimensional surface comprising the steps of:

(a) generating a stereoscopic display of a three-dimensional form;

(b) defining a surface area on said form using a three dimensional cursor;

(c) generating a polygonal mesh covering said defined surface area;

(d) sculpting said polygonal mesh in three dimensions.

2. The method of claim 1 wherein the step of sculpting said polygonal mesh is constrained in accordance with predetermined mechanical properties of a material.

3. The method of claim 1 wherein said polygonal mesh is sculpted with a set of computer generated three-dimensional tools.

4. The method of claim i wherein said stereoscopic display is dichromatic.

5. The method of claim 1 further comprising the steps of mapping surface texture onto said polygonal mesh and generating a stereoscopic display of said mesh with said surface texture applied thereto.

6. In a computer graphics system, a method for generating a three-dimensional image of an object comprising the steps of:

(a) generating a stereoscopic display of a three-dimensional form;

(b) defining a surface area on said form corresponding to a panel of said object using a three dimensional cursor;

(c) generating a polygonal mesh covering said defined surface area;

(d) sculpting said polygonal mesh in three dimensions;

(e) repeating steps (b)–(d) for each panel of said object;

(f) mapping surface texture onto said polygonal mesh of each panel;

(g) generating a stereoscopic display of said object.

7. The method of claim 6 wherein the step of sculpting said polygonal mesh is constrained in accordance with predetermined mechanical properties of a material.

8. The method of claim 6 wherein said polygonal mesh is sculpted with a set of computer generated three-dimensional tools.

9. The method of claim 6 wherein said stereoscopic display is dichromatic.

* * * * *

UNITED STATES PATENT AND TRADEMARK OFFICE
CERTIFICATE OF CORRECTION

PATENT NO. : 5,504,845
DATED      : April 2, 1996
INVENTOR(S) : Maurizio Vecchione It is certified that error appears in the above-indentified patent and that said Letters Patent is hereby corrected as shown below:

On the title page: Item [54]

Title, please delete " remodeling " and insert -- modelling --.

In column 1 at line 48, please delete " 5,333,295 " and insert -- 5,333,245 --.

In column 5, claim 4 at line 24, please delete " i " and insert -- 1 --.

Signed and Sealed this

Seventh Day of January, 1997

Attest:

BRUCE LEHMAN

*Attesting Officer*        *Commissioner of Patents and Trademarks*